United States Patent
Alasry et al.

(10) Patent No.: US 8,996,386 B2
(45) Date of Patent: Mar. 31, 2015

(54) METHOD AND SYSTEM FOR CREATING A VOICE RECOGNITION DATABASE FOR A MOBILE DEVICE USING IMAGE PROCESSING AND OPTICAL CHARACTER RECOGNITION

(75) Inventors: Bilal Alasry, Dearborn, MI (US); Doua Vang, Waterford, MI (US); Bryan Thomas, Canton, MI (US)

(73) Assignees: DENSO International America, Inc., Southfield, MI (US); DENSO Corporation, Kariya-shi, Aichi-ken (JP)

( * ) Notice: Subject to any disclaimer, the term of this patent is extended or adjusted under 35 U.S.C. 154(b) by 563 days.

(21) Appl. No.: 13/009,101

(22) Filed: Jan. 19, 2011

(65) Prior Publication Data

US 2012/0183221 A1    Jul. 19, 2012

(51) Int. Cl.
| | |
|---|---|
| G10L 15/00 | (2013.01) |
| G10L 11/00 | (2006.01) |
| G10L 21/00 | (2013.01) |
| G06F 7/00 | (2006.01) |
| G01C 21/34 | (2006.01) |
| G08G 1/123 | (2006.01) |
| G09G 5/00 | (2006.01) |
| G10L 15/06 | (2013.01) |
| H04M 1/60 | (2006.01) |
| H04M 1/725 | (2006.01) |
| H04M 1/27 | (2006.01) |
| G10L 15/22 | (2006.01) |

(52) U.S. Cl.
CPC ............ *G10L 15/06* (2013.01); *H04M 1/6075* (2013.01); *H04M 1/72519* (2013.01); *H04M 1/271* (2013.01); *G10L 2015/228* (2013.01)

USPC ........... 704/275; 704/231; 704/235; 704/251; 704/270; 701/1; 701/533; 345/1.1; 345/2.1; 345/7; 345/8; 345/156

(58) Field of Classification Search
CPC ....... G10L 15/00; G10L 15/26; G10L 15/265; G10L 15/22; G10L 15/24; G10L 15/18; G10L 15/08; G10L 15/19; B60R 16/0373; G01C 21/3608; G06F 3/16; A63F 13/00
USPC .............. 704/231, 235, 251, 275, 270; 701/1, 701/533; 345/1.1, 2.1, 7, 8, 156
See application file for complete search history.

(56) References Cited

U.S. PATENT DOCUMENTS

| | | | |
|---|---|---|---|
| 5,878,395 A | * | 3/1999 | Bennett ......................... 704/275 |
| 6,240,347 B1 | * | 5/2001 | Everhart et al. ................. 701/36 |

(Continued)

FOREIGN PATENT DOCUMENTS

JP    2005-100277    4/2005

*Primary Examiner* — Paras D Shah
(74) *Attorney, Agent, or Firm* — Harness, Dickey & Pierce, P.L.C.

(57) ABSTRACT

A method and system for controlling a mobile device from a head unit using voice control is disclosed. The head unit receives a graphical representation of a current user interface screen of the mobile device. The head unit than scans the graphical representation of the current user interface screen to determine the locations of potential input mechanisms. The potential input mechanisms are scanned using optical character recognition and voice commands are determined for the input mechanisms. The determined voice commands and their respective locations on the user interface screens are stored in a voice recognition database, which is queried with uttered voice commands during voice recognition.

16 Claims, 8 Drawing Sheets

(56) References Cited

U.S. PATENT DOCUMENTS

| | | | |
|---|---|---|---|
| 6,847,336 B1* | 1/2005 | Lemelson et al. | 345/8 |
| 7,286,857 B1* | 10/2007 | Walker et al. | 455/569.2 |
| 7,409,344 B2* | 8/2008 | Gurram et al. | 704/251 |
| 7,526,103 B2* | 4/2009 | Schofield et al. | 382/104 |
| 7,672,851 B2* | 3/2010 | Gurram et al. | 704/275 |
| 7,764,247 B2* | 7/2010 | Blanco et al. | 345/7 |
| 7,792,678 B2* | 9/2010 | Hung | 704/275 |
| 2002/0046033 A1* | 4/2002 | Ono et al. | 704/270 |
| 2005/0132420 A1* | 6/2005 | Howard et al. | 725/135 |
| 2007/0069976 A1* | 3/2007 | Willins et al. | 345/8 |
| 2008/0147308 A1* | 6/2008 | Howard et al. | 701/200 |
| 2008/0195380 A1* | 8/2008 | Ogasawara | 704/10 |
| 2008/0221891 A1* | 9/2008 | Konig et al. | 704/252 |
| 2009/0055180 A1* | 2/2009 | Coon et al. | 704/251 |
| 2010/0100310 A1* | 4/2010 | Eich et al. | 701/201 |
| 2010/0220250 A1* | 9/2010 | Vanderwall et al. | 348/837 |

* cited by examiner

METHOD AND SYSTEM FOR CREATING A VOICE RECOGNITION DATABASE FOR A MOBILE DEVICE USING IMAGE PROCESSING AND OPTICAL CHARACTER RECOGNITION

FIELD

The present disclosure relates to a method and system for creating a voice recognition database for a mobile device using image processing and character recognition.

BACKGROUND

Typical head units of vehicles provide users with complex user interfaces for controlling systems within the vehicles. For example, the user interface of the head unit allow a user to control an audio/visual system of the vehicle, an HVAC system, and/or a GPS system. The head unit may have a touch screen, whereby the user can enter user input by touching a section of the screen corresponding to a command for adjusting or controlling an attribute of one of the systems. For example, the user can adjust the volume of the audio/visual system by pressing a section of the screen displaying an input mechanism, e.g. a button, for adjusting the volume levels.

Additionally, the head unit of a vehicle may have a set of predefined commands for providing user input. A user will issue a voice command by uttering a specific command, e.g. "Increase Volume." A voice recognition module associated with the head unit executes voice recognition software to identify the word or phrase uttered by the user. The voice recognition module will then determine if the uttered word or phrase is a recognized command. If so, the voice recognition module will communicate the recognized command to the appropriate vehicle system, which executes the command.

Further, a user can synchronize a mobile device to the vehicle head unit. The mobile device will connect to the head unit via a wired connection, e.g. a USB connection, or wireless connection, e.g. a Bluetooth connection. Once connected, a user can have limited interaction with the mobile device via the head unit. For example, a user can perform hands free talking or can have access to a play list on the mobile device. The user, however, is unable to control the mobile device using the voice recognition capabilities of the vehicle's head unit. Furthermore, as more third party developers develop applications for mobile devices, there is a growing need for an efficient way to issue voice commands for the applications through the vehicle head unit.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect of the disclosure, a method for remotely operating a mobile device using a vehicle head-unit is disclosed. The method comprises receiving a representation of a user interface screen of the mobile device from the mobile device and scanning the representation of the user interface screen to find a representation of an input mechanism. The input mechanism is used to provide a command to the mobile device. The method further comprises scanning the representation of the input mechanisms to determine a voice recognition command and associating the voice recognition command with the input mechanism in a voice recognition database. When a user utters the voice recognition command the head unit transmits a signal corresponding to the input mechanism to the mobile device.

In another aspect of the disclosure, a head unit of a vehicle configured to remotely operate a mobile device using voice recognition is disclosed. The head-unit comprises a communication module that receives a representation of a user interface screen of the mobile device from the mobile device. The head unit further includes an image scanning module that scans the representation of the user interface screen to find a representation of an input mechanism on the representation of the user interface screen. The input mechanism is used to provide a command to the mobile device. The head unit further comprises a character recognition module that scans the representation of the input mechanism found by the image scanning module to determine a voice recognition command, wherein the voice recognition command is determined based on at least one character or symbol identified by the character recognition module. The head unit also includes a mobile device voice recognition database that stores the voice recognition command corresponding to the input mechanism found in the user interface screen. When a user utters the voice recognition command the head unit transmits a signal corresponding to the input mechanism to the mobile device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
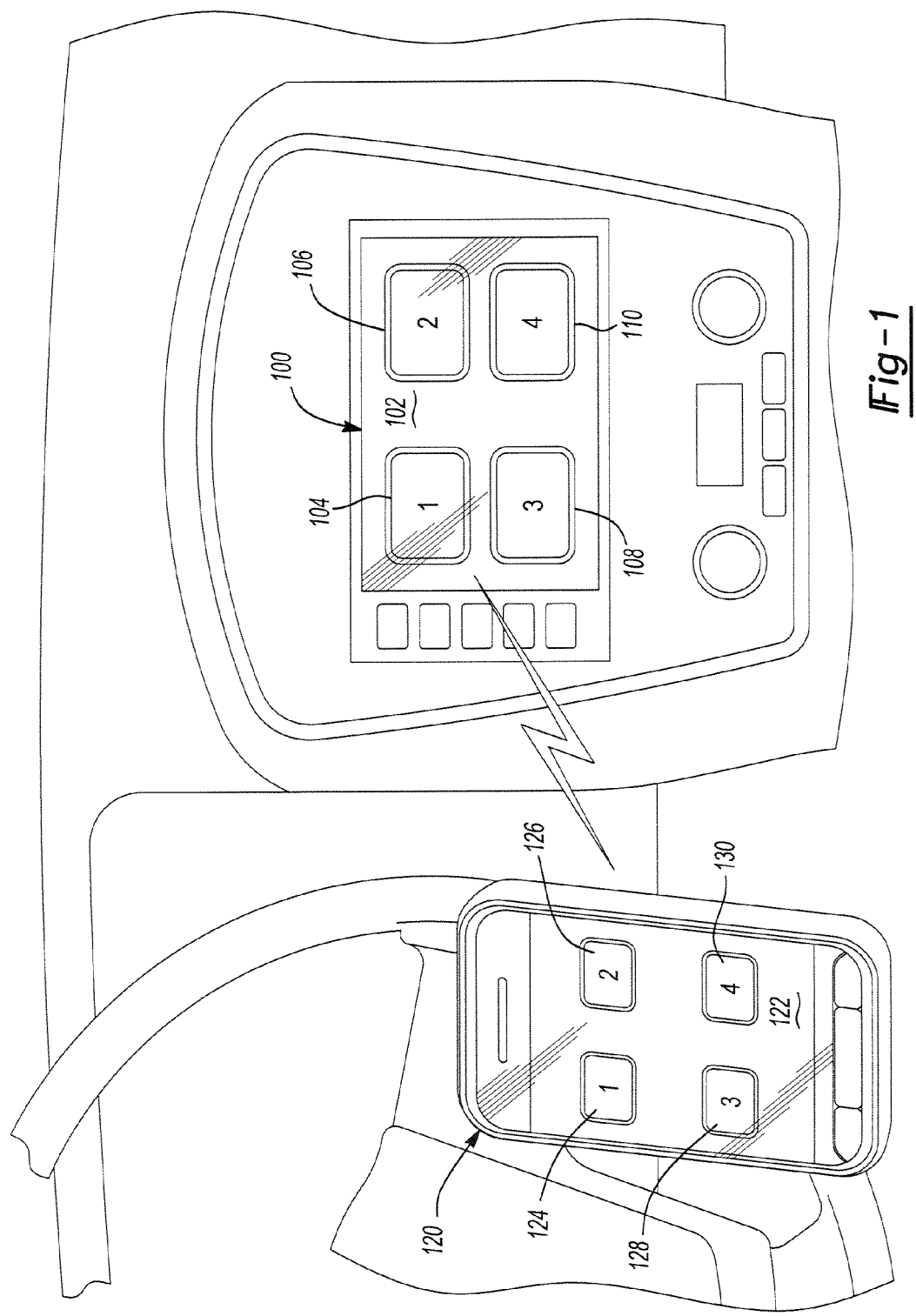
FIG. 1 is a drawing illustrating exemplary user interface screens of a mobile device and a vehicle head unit.

As vehicle head units are becoming more advanced, so too are the communication capabilities between the head unit and mobile devices of a user. Referring now to FIG. 1, an exemplary head unit 100 and mobile device 120 are shown. The head unit 100 is typically located at the center console of the vehicle and allows a user to control various aspects of the vehicle. For instance, the user can control the vehicle's audio/visual system, HVAC system, or GPS system using a touch screen that displays user interface 102 having input mechanisms 104, 106, 108, and 110 to the user. The user can touch an input mechanism 104, 106, 108, or 110 on the screen to issue a command to the head unit 100.

The head unit 100 is further configured to connect to or communicate with the mobile device 120. The connection between the mobile device 120 and the head unit 100 can be established by way of a wired connection, e.g. a USB connection, or a wireless connection, e.g. a Bluetooth or WiFi connection. Once a connection is established between the head unit 100 and the mobile device 120, the exemplary head unit 100 can receive a representation of the current user interface 122 of the mobile device 120. The current user interface 122 of the mobile device 120 is the screen currently displayed by the mobile device 120. The head unit 100 is configured to display the graphical representation of the current user interface 102 on the screen of the head unit 100.

The current user interface 122 of the mobile device 120 includes input mechanisms 124, 126, 128, and 130 displayed on the screen of the mobile device 120. Exemplary input mechanisms 124, 126, 128, and 130 are buttons having symbols or text indicating a command that can be executed by the mobile device 120. The input mechanisms 124, 126, 128, and 130 displayed on the screen of the mobile device 120 are dependant on the state of the mobile device 120 itself. For instance, if the mobile device 120 is in a default state, the user interface may present a user will a plurality of applications to choose from. Exemplary applications include a telephone application, a text messaging application, a GPS or maps application, a music player application, a weather application, an email application and third party applications. If the mobile device is executing an application, e.g. the user has selected the telephone application or a third party application, the user interface 122 of the mobile device 120 will display input mechanisms 124, 126, 128, and 130 specific to the application.

As mentioned, the head unit 100 receives the current user interface 122 of the mobile device 120 and displays a user interface 102 corresponding to the current user interface 122 displayed by the mobile device 120, including input mechanisms 104, 106, 108, and 110. The input mechanisms 104, 106, 108, and 110 displayed on the head unit 100 can be used by the user to provide input to the mobile device 120. The user presses the section of the screen displaying the input mechanism 104, 106, 108, or 110, and the head unit 100 will transmit a message to the mobile device 120 indicating that a particular input mechanism or location of the screen was pressed or selected by the user. The effect of pressing one of the input mechanisms 104, 106, 108, and 110 is the same as if the user had pressed a corresponding input mechanism 124, 126, 128, or 130 on the mobile device 120. Upon receiving the communication from the head unit 100, the mobile device 120 executes a command corresponding to the input mechanism 104, 106, 108, or 110 pressed by the user.

Figure 2A:
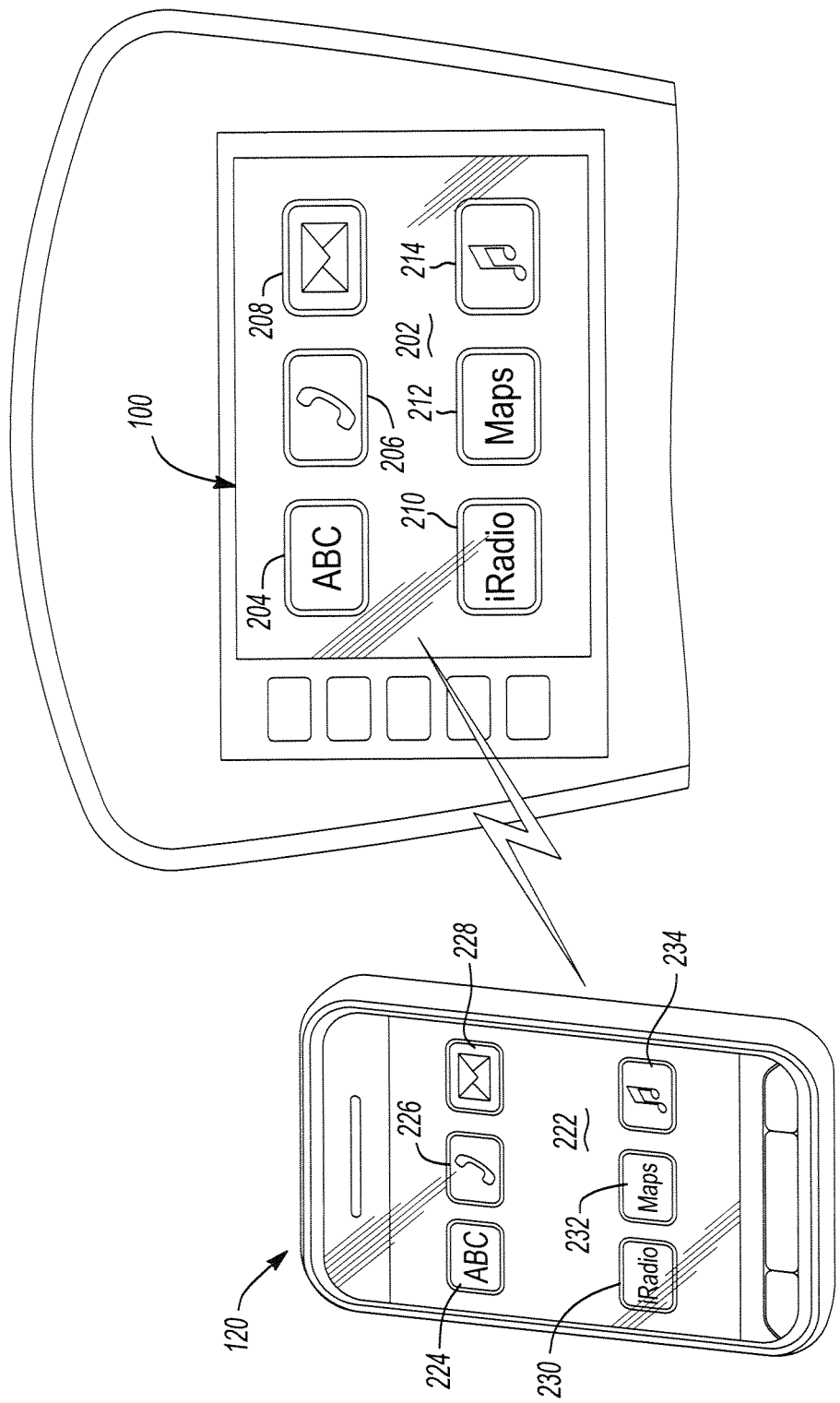
FIGS. 2A and 2B are drawings illustrating a default user interface of a mobile device and an application user interface, respectively.
Figure 2B:
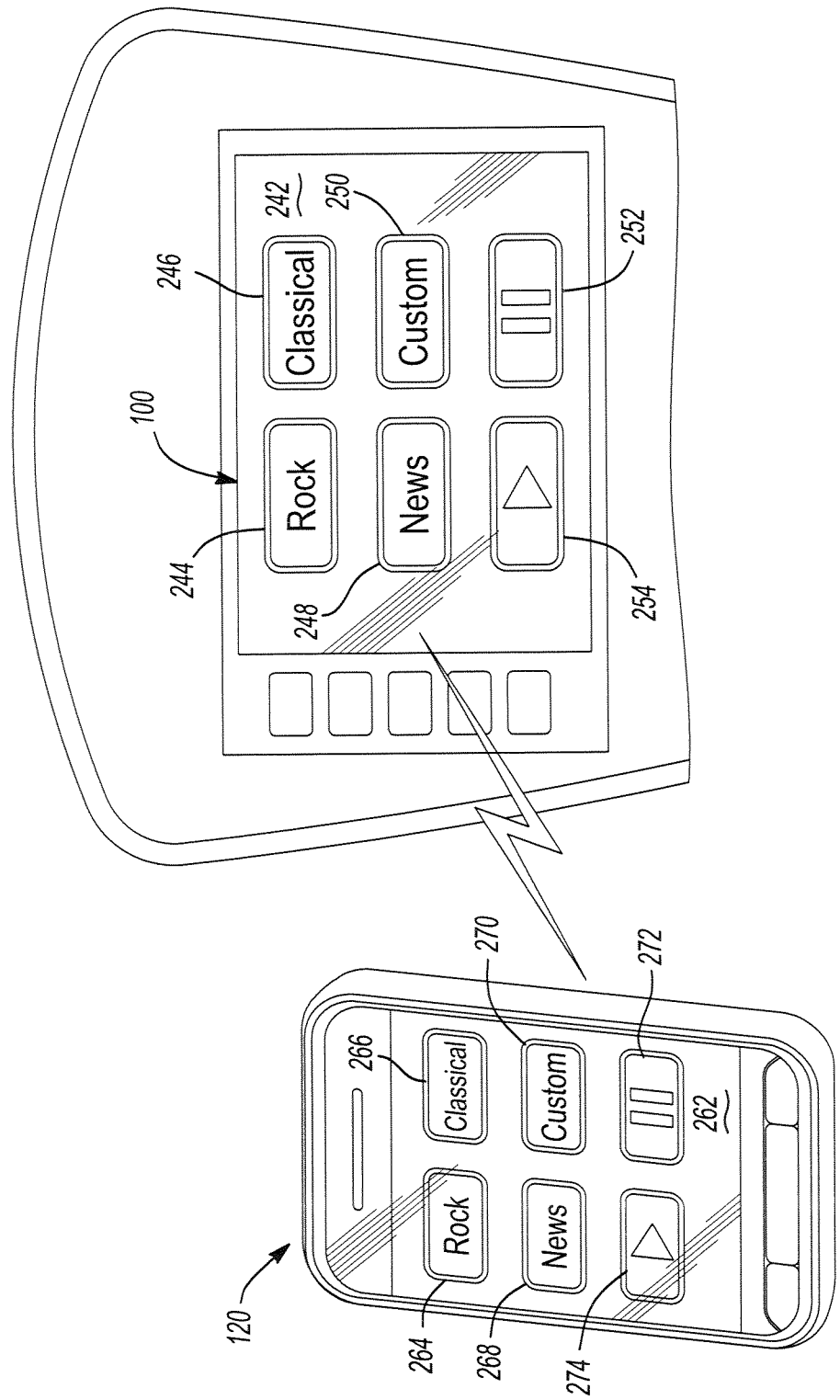

FIGS. 2A and 2B illustrate exemplary user interface screens. FIG. 2A illustrates an exemplary default screen 222 and a corresponding default user interface screen 202 displayed on the head unit 100. In the default user interface screen 222 of the mobile device 120, a plurality of exemplary input mechanisms are displayed. The plurality of exemplary input mechanisms include input mechanisms to initiate a text messaging application 224, a telephone application 226, an email application 228, an internet radio application 230, a GPS application 232, and a music player application 234 are depicted. A corresponding plurality of input mechanisms 204, 206, 208, 210, 212, and 214 are displayed on the screen of the head unit 100. The user can press one of the input mechanisms on either the head unit 100 or the mobile device 120 to initiate the application corresponding to the selected input mechanism.

FIG. 2B illustrates an exemplary user interface 262 of an application selected by a user and executing on the mobile device 120. The head unit 100 is displaying a corresponding user interface 242. In the example provided in FIG. 2B, the user has selected the internet radio application input mechanism 210 or 230 (FIG. 2A). Thus, a user interface 262 for an internet radio application is displayed on the screen of the mobile device 120 and a corresponding user interface 242 is displayed on the screen of the head unit 100. As previously discussed, the head unit 100 receives a representation of the current user interface 262 from the mobile device 120 and displays the representation on the screen of the head unit 100. The user interface 262 includes a plurality of input mechanisms 264, 266, 268, 270, 272, and 274 for controlling the internet radio application. For instance, the input mechanisms for the internet radio application can include input mechanisms for selecting a "Rock" radio station 264, a "Classical" radio station 266, a "News" station 268, and a "Custom" station 270. Further, input mechanisms having symbols displayed thereon include input mechanisms to pause 272, e.g. two vertical bars, or play 274, e.g. a right pointing triangle, a radio stream. The head unit 100 displays corresponding input mechanisms 244, 246, 248, 250, 252, and 254. The user can control the internet radio application from the head unit 100 or the mobile device 120.

The examples provided in FIGS. 2A, and 2B are meant to provide an example of user interfaces for controlling the mobile device 120 or applications executing thereon and how the head unit 100 can display the current user interface of the mobile device 120. The applications and user interfaces provided are exemplary in nature and not intended to be limiting.

Figure 3:
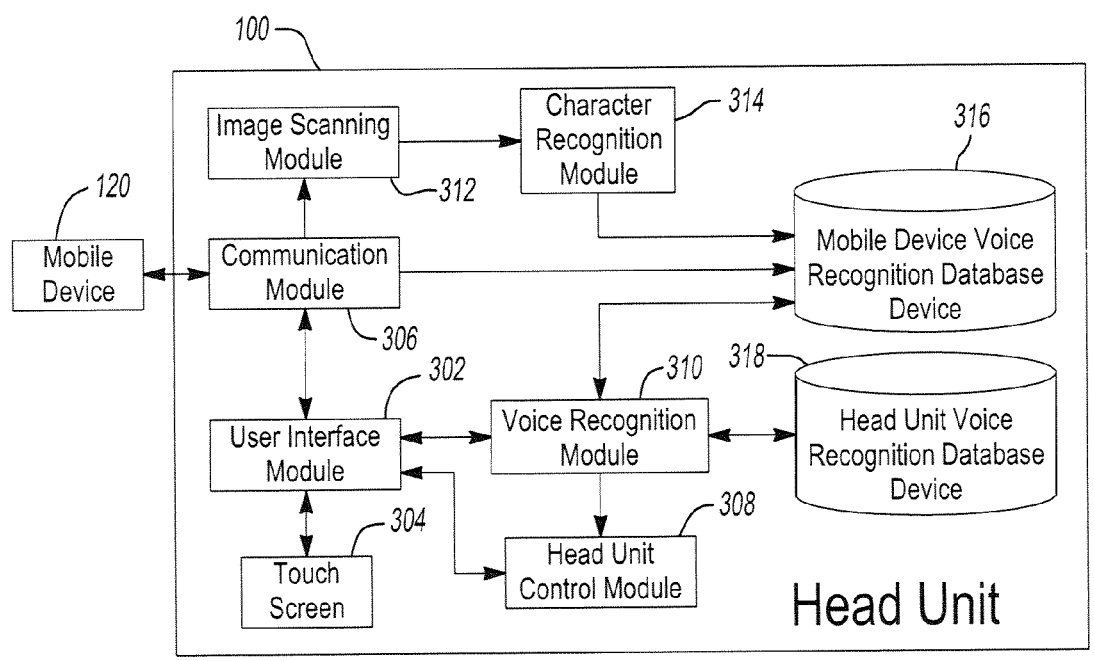
FIG. 3 is a component diagram illustrating exemplary components of a head unit for performing voice recognition.

The exemplary head unit 100 includes voice recognition capabilities. Voice recognition capabilities allow a user to utter voice commands for controlling various systems within the vehicle. FIG. 3 illustrates an exemplary head unit 100 and components of the head unit 100 for performing voice recognition and controlling other vehicle systems.

As described above, the head unit 100 can connect and communicate with a mobile device 120 via a communication module 306. As previously discussed, the mobile device 120 and the head unit 100 can communicate over wired or wireless connections. A communication module 306 is configured to allow communication between the two devices 100 and 120. Thus, in some embodiments, the communication module 306 may include a port to support the wired communication, e.g. a USB port. In other embodiments, the communication module 306 may include a transceiver to support wireless communication, e.g. WiFi or Bluetooth. Using the communication module 306 the head unit 100 receives the graphical representation of the current user interface 122 from the mobile device 120, and the head unit 100 communicates commands to the mobile device 120. It is appreciated that other communications between the head unit 100 and the mobile device 120 can be enabled, such as the ability to perform hands free talking.

As mentioned the head unit 100 includes voice recognition capabilities, which are performed in part by a voice recognition module 310. The voice recognition module 310 can include a microphone (not shown) for receiving speech commands from a user. In some embodiments, the voice recognition module 310 parses the speech command into phonemes and determines the word or phrase uttered based on the phonemes. The voice recognition module 310 may use any now known or later developed speech recognition techniques, such as Hidden Markov Models (HMM) or dynamic time warping based speech recognition. Once a word or phrase is determined from the speech, the voice recognition module 310 can query a mobile device voice recognition database 316 or a head unit voice recognition database 318 to determine if a valid command has been entered. If a valid command is found in one of the databases 316 or 318, the database will return a voice recognition action to the voice recognition module 310. A voice recognition action indicates to the voice recognition module 310 what action the speaker has requested. For instance, in the case that a command is found in the head unit voice recognition database 318, the voice recognition module 310 receives a voice recognition action which indicates a command to adjust or control a setting in one of the settings of the vehicle, i.e. adjust a particular HVAC setting or adjust the volume of the audio/visual system. In this scenario, the voice recognition module 310 can communicate the command to a head unit control module 308, which transmits commands to the various vehicle systems.

When a voice command is found in the mobile device voice recognition database 316, the voice recognition module 310 receives a voice recognition action which indicates an input mechanism selected by the user. For example, if the user interface module 302 is displaying a user interface 242 (FIG. 2B) corresponding to the internet radio user interface 242 (FIG. 2B) executing on the mobile device 120 and the user utters the word "Rock," the voice recognition module 310 receives an voice recognition action corresponding to the "Rock" input mechanism 264 (FIG. 2B). The voice recognition module 310 then communicates the voice recognition action to the user interface module 302, thereby indicating to the user interface that the user has selected a particular input mechanism. The user interface module 302 in turn transmits a signal to the mobile device 120, via the communication module 306, indicating that the particular input mechanism has been selected. The mobile device 120 receives the signal and executes the command corresponding to the user selection.

The head unit voice recognition database 318 can be preloaded with predefined voice commands. An entry in the head unit voice recognition database 318 can include a field for the actual command and a voice recognition action. In some embodiments, an entry in the head unit voice recognition database 318 can further include a field for the user interface screen or screens to which the voice command corresponds to. For example, in these embodiments, if the head unit 100 is displaying a user interface screen relating to the audio/visual system, a command for adjusting the HVAC settings may not be recognized.

The mobile device voice recognition database 316 is dependant on the mobile device 120 of a user, and a state thereof. Further, the head unit 100 likely has no prior knowledge of the user interface screens or the set of voice commands for controlling the mobile device 120. Thus, the head unit 100 is configured to learn the input mechanisms of the current user interface 122 (FIG. 1) of the mobile device 120, and to populate the mobile device voice recognition database 316 based on the learned input mechanisms.

The head unit 100 includes an image scanning module 312 and a character recognition module 314 to determine the locations of input mechanisms on the current user interface 122 (FIG. 1) and to determine a voice command to associate with located input mechanisms, respectively. The image scanning module 312 receives the graphical representation of the current user interface 122 (FIG. 1) from the mobile device 120 and scans the graphical representation of the user interface 122 to locate predefined shapes which are indicative of an input mechanism. For example, the image scanning module 120 can look for borders that form predefined shapes, such as squares, rectangles, or circles. Further, in some embodiments, the head unit 100 may be configured to receive firmware updates. In these embodiments, as new popular applications are designed and made available for the mobile device 120, the image scanning module 312 can be updated to search for particular patterns indicative of input mechanism of the popular applications. In some embodiments, the image scanning module 312 outputs graphical representations of the input mechanisms and the locations and dimensions of the input mechanisms to the character recognition module 314. In other embodiments, the character recognition module 314 can receive the entire graphical representation of the user interface. In these embodiments, the image scanning module 312 outputs the locations of found input mechanisms to the character recognition module 314.

The character recognition module 314 determines voice commands for the current user interface based on the locations of found input mechanisms. The character recognition module 314 will perform character recognition on the input mechanisms to determine the text on the input mechanism or a known symbol. In some embodiments, the character recognition module 314 performs optical character recognition on the input mechanisms. In these embodiments, the character recognition module 314 recognizes the fixed static shape of one or more characters or symbols. When more than one character is identified, the character recognition module 314 generates a string of characters corresponding to the identified characters. When the character recognition module 314 identifies a symbol, the character recognition module 314 can use a look-up table or a similar sufficient structure to determine a word or phrase to associate with the symbol. For example, if a gas pump symbol is identified, the look-up table may associate the phrase "Gas Station" with the station with the gas pump symbol.

In the instance that characters are detected, the character recognition module 314 will determine a word or phrase on the analyzed input mechanism and will generate a voice command entry for the mobile device voice recognition database 316. For instance, in the user interface 242 of the head unit 100 depicted in FIG. 2B, the character recognition module 314 will scan the input mechanism 244 and determine that from left to right, the characters R-O-C-K are spelled out in the input mechanism 244. The character recognition module 314 will then generate an entry for the input mechanism 244. The entry will include the voice command "ROCK," and the location on the user interface 242 where the "Rock" input mechanism 244 is displayed. The character recognition module 314 can further include an application identifier in the entry for the input mechanism 244, such that when the voice recognition module 310 is performing voice recognition for a voice command uttered during the execution of a particular application, an increased accuracy of the voice recognition may be achieved.

In the instance that a symbol is detected by the character recognition module 314, the character recognition module 314 will look the symbol up in a look-up table or equivalent structure to determine a word or phrase associated with the symbol. For instance, in the user interface 242 of the head unit 100 depicted in FIG. 2B, the character recognition module 314 will scan the input mechanism 254 and determine that a right-pointing triangle is depicted. The character recognition module 314 will query the look-up table and determine that a right-pointing triangle is the recognized symbol for "Play." Further, the look-up table may have additional analogous words to associate with the symbol, such as "Resume" or "Start." The character recognition module will then generate a database entry for the "play" input mechanism 254 using the terms retrieved from the look-up table. The database entry will include the voice command "PLAY" and the location on the user interface 242 where the "Play" input mechanism 254 is displayed. The character recognition module 314 can further include entries for the analogous words as well, if more than one word is associated with the identified symbol. The character recognition module 314 can further include an application identifier in the entry for the input mechanism 254, such that when the voice recognition module 310 is performing voice recognition for a voice command uttered during the execution of a particular application, an increased accuracy of the voice recognition may be achieved.

Once the character recognition module 314 has populated the mobile device voice recognition database 316, the voice recognition module 310 can support voice commands for the mobile device 120. The voice recognition module 310 determines if the mobile device 120 is connected to or in communication with the head unit 100 and if so, will query the mobile device voice recognition database 316 with received voice commands. If the voice command is found in the mobile device voice recognition database 316, the voice recognition module 310 sends a message to the user interface module 302 indicating that the user has selected a particular input mechanism corresponding to the voice command. The user interface module 302 then notifies the mobile device 120 that the particular input mechanism has been selected. It is appreciated that in other embodiments, the voice recognition module 310 can communicate the selection of a user to the mobile device 120 directly. If the command is not found, the voice recognition module 310 will query the head unit voice recognition datastore 318 to determine if the user has uttered a voice command specific to the head unit 100. For example, the user may utter a command to disconnect the mobile device 120.

It is appreciated that the exemplary components of the head unit 100 are provided for example and are not limiting. It is appreciated that other configurations and components can be implemented to achieve the functionality described herein. For instance, the head unit 100 may further include a module that creates voice recognition database entries upon receiving a voice command and a corresponding location or action. Furthermore, the list of components described are the components to achieve the described functionality. Additional components of the head unit 100 which would not affect the voice recognition capabilities of the head unit 100 are not shown.

Figure 4:
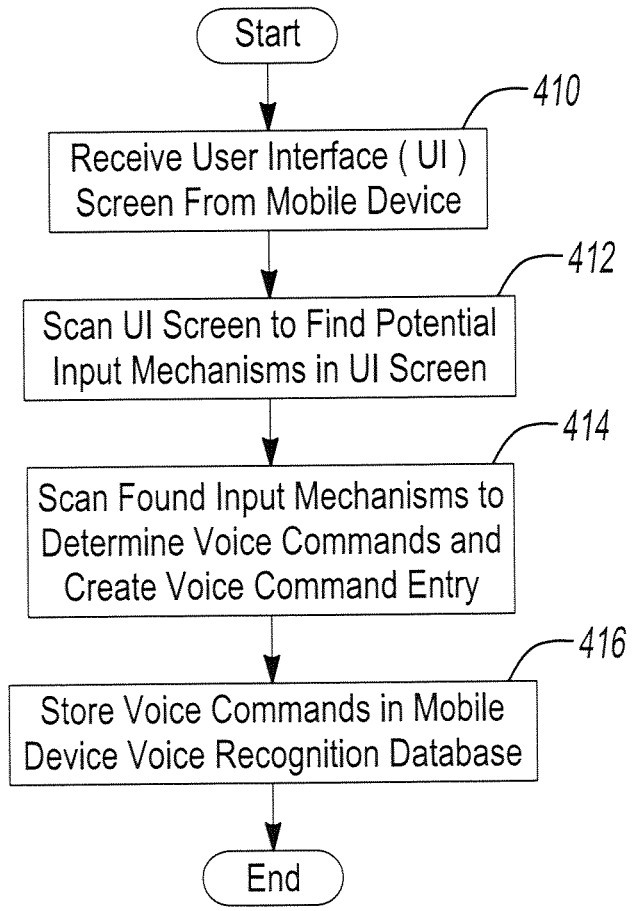
FIG. 4 is a flow chart illustrating an method for populating a mobile device voice recognition database of a head unit.

Referring now to FIG. 4 exemplary steps for populating a mobile device voice recognition database 316 are depicted. Generally, the head unit 100 will receive a graphical representation of the current user interface screen from the mobile device 120, as shown at 410. In some embodiments, the head unit 100 will receive the graphical representation as raw data. The head unit 100 will either have to convert the raw graphical representation into a format that is compatible with the image scanning module 312 or the image scanning module 312 is configured to process the raw graphical representation.

The image scanning module 312 will scan the graphical representation of the current user interface to determine the possible locations of the input mechanisms depicted in the current user interface of the mobile device 120, as shown at step 412. The image scanning module 312 will scan the image searching for predetermined shapes. For instance, the image scanning module 312 can scan the graphical representation of the user interface for squares, rectangles, or circles. Each instance of the predetermined shape is recorded as a potential input mechanism and analyzed by the character recognition module 314. It is appreciated that the image scanning module 312 can describe the potential input mechanisms in any known manner. For instance, the image scanning module 312 can identify a center point, a height, and a width of the of the potential input mechanism. Further, the image scanning module 312 can record the shape of the potential input mechanism. The image scanning module 312 provides the data relating to each potential input mechanism to the character recognition module 314.

The character recognition module 314 receives the locations of potential input mechanisms with respect to the graphical representation of the user interface and performs optical character recognition on the potential input mechanisms, as shown at step 414. In an exemplary embodiment, the character recognition module 314 can be configured to recognize different characters or symbols. Assuming that the language being analyzed is written left to right, e.g. English, German, Russian, the character recognition module 314 may scan the area of the potential input mechanism from left to right. If a character or symbol is found, the character recognition module 314 will check a look-up table stored in the memory of the head unit 100 to determine if the character or symbol is a recognized character or symbol. If the character or symbol is recognized, the character recognition module 314 records the recognized character or symbol in a string or similar structure. The character recognition module 314 continues to scan the input mechanism in this manner until the potential input mechanism has been completely analyzed.

Furthermore, the character recognition module 314 can be programmed to recognize combinations of characters and symbols that are particular to popular applications. It is appreciated that the majority of applications available by users are designed by third party developers. These third party applications range in subject matter from internet banking applications, to Internet radio applications and social networking applications, and are selectively downloaded to the mobile device 120 by the user. It is appreciated that some of the third party applications are extremely popular. These popular applications may have input mechanisms that have symbols in lieu of words. The character recognition module 314 can be updated, e.g. via a firmware update, to recognize symbols that are specific to popular third party applications as the third party application becomes available or popular. For instance, one currently popular third party application is the Pandora® Radio Application. The Pandora® Radio application user interface includes input mechanisms having a thumb pointing up and a thumb pointing down that are displayed so that the user may indicate to the Pandora® system whether the user likes or dislikes a song. Based on the popularity of the Pandora® Radio application, the character recognition module 314 can be updated to recognize these symbols which are specific to Pandora. Thus, when the Pandora® Radio user interface is being displayed and the character recognition module 314 encounters a thumb pointing up, the character recognition module 314 will associate a word or phrase such as "like" and/or "thumbs up" with the input mechanism, such that when the user utters "like" the voice recognition module will understand that the user is selecting the input mechanism with the thumb pointing up.

Once optical character recognition is performed on an input mechanism, the character recognition module 314 will generate a voice command entry for the mobile device voice recognition database 316. A voice command entry includes the voice command and the location of the input mechanism on the user interface screen. Thus, when a voice command is found in the mobile device voice recognition database 316, the voice recognition module 310 can indicate to the mobile device 120 which input mechanism the user has selected. Additionally, in the instance where a symbol was recognized, the voice command entry will have the word or phrase that the symbol represents in place of the symbol. Further, if more than one word or phrase are associated with the symbol, e.g. "like" and "thumbs up", separate voice command entries can be generated by the character recognition module 314, each of which includes the same location or action of the input mechanism. The voice command entry may further include a field indicating which user interface screen and/or application that the entry belongs to. Once one or more voice command entries are generated by the character recognition module 314, the voice command entries can be stored in the mobile device voice recognition database 316, as shown at step 416.

Figure 5:
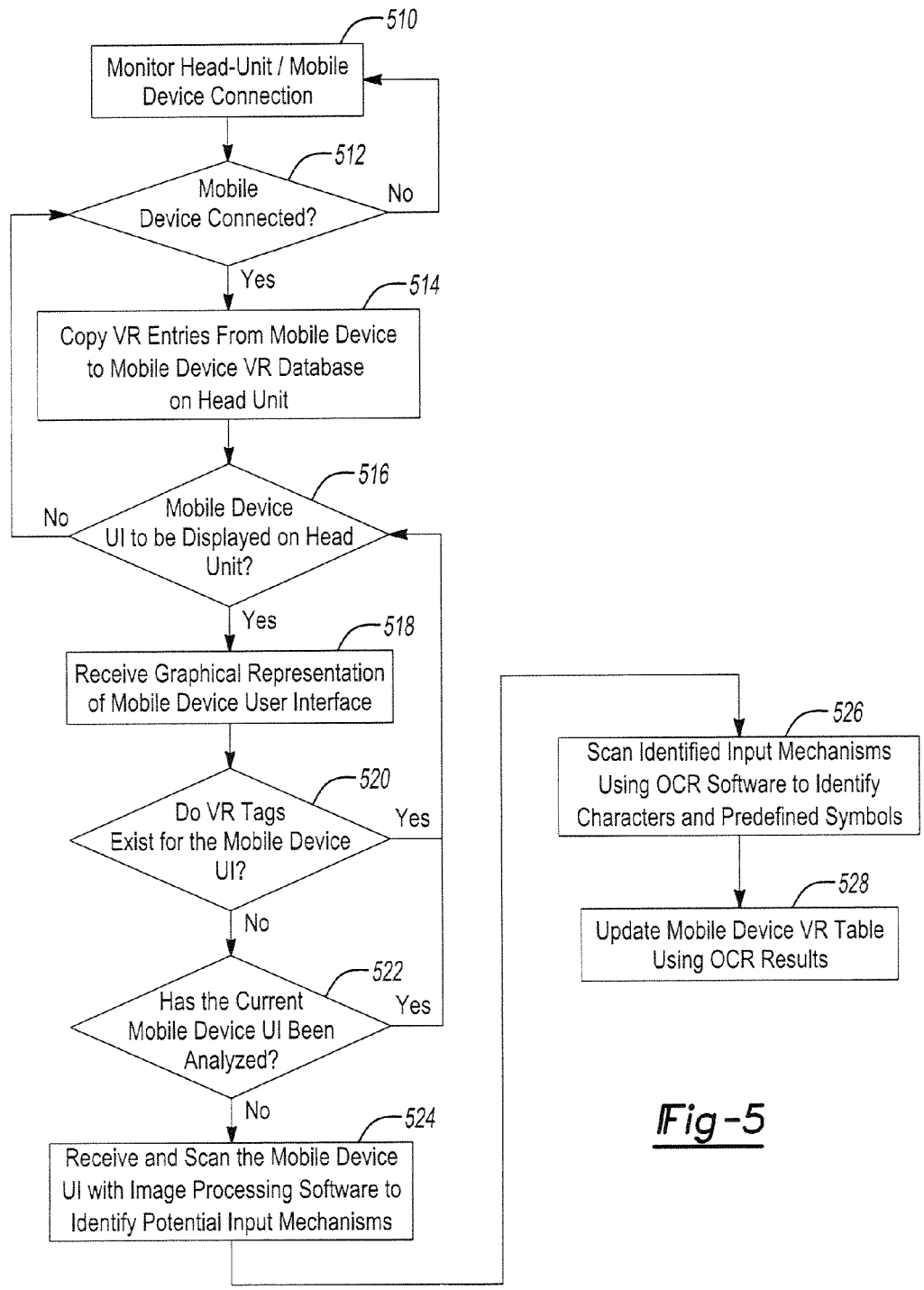
FIG. 5 is a flow chart illustrating an alternate method for populating a mobile device voice recognition database of a head unit.

Referring now to FIG. 5, an exemplary method for populating a mobile device voice recognition database 316 is depicted. The head unit 100 is enabled to detect when the mobile device 120 requests to initiate communication therewith. Thus, the head unit 100 monitors the communication module 306 to determine if a connection with the mobile device 120 has been established, as shown at steps 510 and 512.

Once a connection is established between the mobile device 120 and the head unit 100, the head unit 100 will receive a set of predefined voice recognition commands of the mobile device 120, if available, from the mobile device 120, as shown at step 514. The mobile device 120 may have a voice recognition database preloaded thereon. For instance, the voice recognition database of the mobile device 120 may include the voice command entries for initiating telephone calls to the user's contacts. Thus, the head unit 100 may receive the entries of the voice recognition database of the mobile device 120 and store them in the mobile device voice recognition database 316 or a third database specific for predefined voice commands. If the entries are stored in the mobile device voice recognition database 316, the entries may include an actual command to communicate to the telephone, rather than a location of an input mechanism.

The head unit will then determine if a user interface screen needs to be scanned and analyzed. The head unit 100 will determine if the user interface of the mobile device 120 is to be displayed on the head unit touch screen 304 (FIG. 3), as shown at step 516. In some embodiments, the head unit 100, upon detecting a connection with the mobile device 120 will ask the user if the user would like the mobile device 120 user interface to appear on the display 304 of the head unit 100. If the user answers in the affirmative, then the mobile device 120 will transmit a graphical representation of the current user interface to the head unit 100, as shown at step 518.

It is appreciated that when the mobile device 120 transmits the current user interface to the head unit 100, the mobile device 120 may include additional metadata indicating whether the user interface is an application user interface or a user interface of the mobile device 120. Further, an identifier can be assigned to the particular user interface screen. Using this metadata, the head unit 100 can determine whether predefined voice recognition commands for the current user interface screen were previously received from the mobile device 120 (at step 514), as shown at step 520. If voice commands were received for the current user interface screen, then the head unit 100 does not need to analyze the user interface screen, and the head unit 100 waits to receive the next user interface screen from the mobile device 120, e.g. steps back to step 516.

If, however, no predefined voice recognition commands were received, then the head unit 100 determines whether the current user interface has been previously analyzed, as shown at step 522. Again, the head unit 100 can use the metadata pertaining to the current user interface to determine if the current If the current user interface has been previously analyzed. If the current user interface screen has been analyzed, then the head unit 100 waits to receive the next user interface screen from the mobile device 120, e.g. steps back to step 516. If the current user interface screen has not been analyzed, then the head unit 100 determines that the current user interface screen is to be analyzed.

As described in greater detail above, the image scanning module 312 will receive and scan the current user interface screen received from the mobile device 120 to determine where any potential input mechanisms are located on the user interface screen, as shown at step 524. If one or more potential input mechanisms are located on the current user interface screen, the character recognition module 314 will perform character recognition on the potential input mechanisms to determine a voice command to associate with the potential input mechanisms, as shown at step 526. The character recognition module 314 will create a voice command entry for each input mechanism that had characters or recognizable symbols displayed thereon. The voice command entries are then stored in the mobile device voice recognition database 316, as shown at step 528. It is appreciated that in some instances, the image scanning module 312 and/or the character recognition module 314 may falsely identify a location of the screen as an input mechanism. In these instances, an entry may still be generated and stored in the mobile device voice recognition database 316. If the user utters a voice command corresponding to the falsely identified input mechanism, the voice recognition module 310 or user interface module 302 will communicate the location of the falsely identified input mechanism to the mobile device 120, which will be disregarded by the mobile device 120, e.g. as if the user pressed a portion of the screen that was not associated with a command.

It is appreciated that the method depicted in FIG. 5 is merely illustrative in nature and is not intended to be limiting. It is appreciated that additional steps may be performed and some of the steps may be performed out of order.

Figure 6:
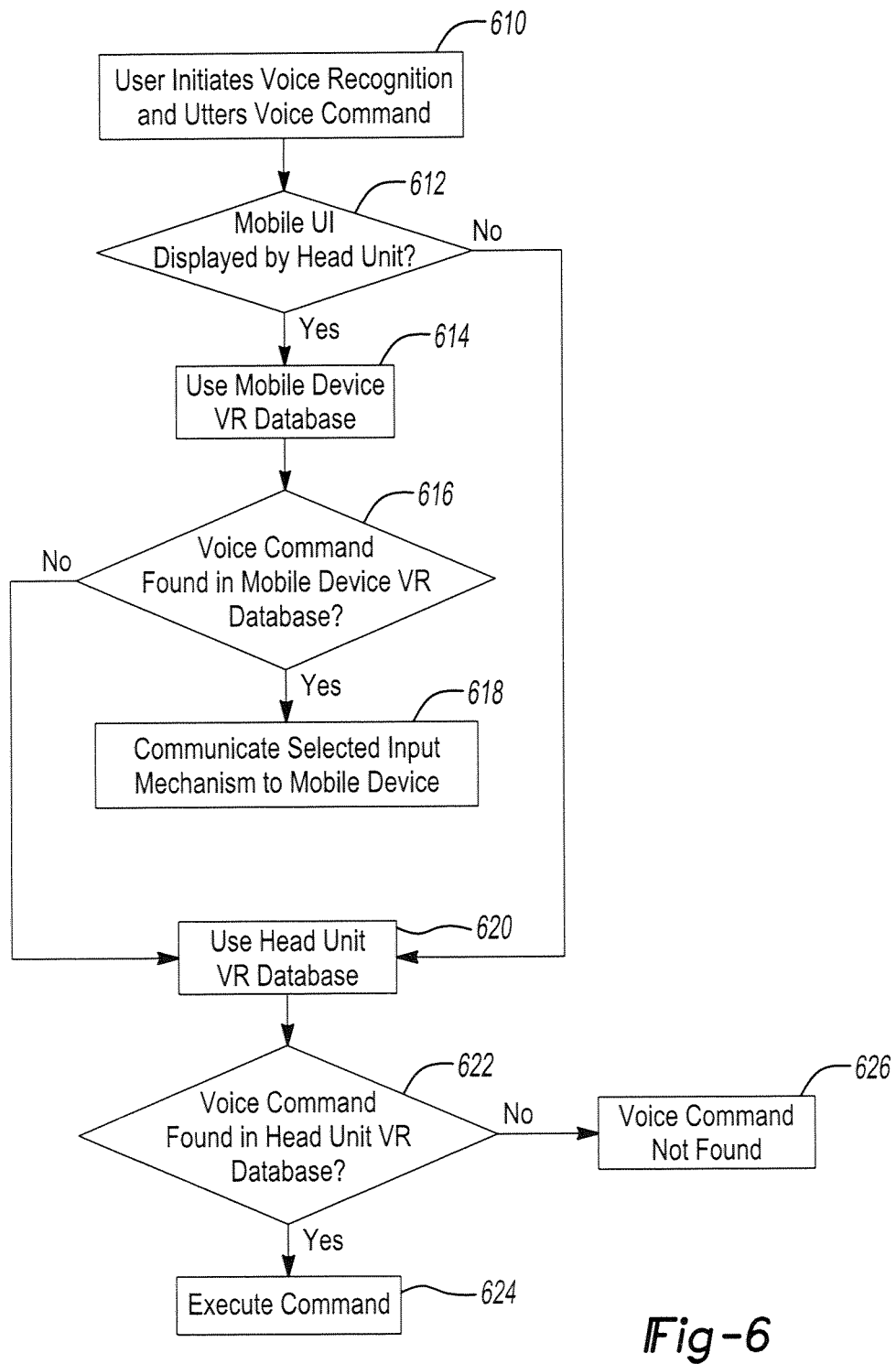
FIG. 6 is a flow chart illustrating an exemplary method for performing voice recognition.

Referring now to FIG. 6, a method for performing voice recognition is depicted. Typically, when a user wants to use the voice recognition feature of a vehicle, the user will initiate voice recognition by pressing a button located in the vehicle, e.g. on the steering wheel or counsel of the vehicle. Thus to initiate voice recognition, the user will press a voice recognition button and utter a command, as shown at step 610. The voice recognition module 310 will then determine which database to use for voice recognition—that is, the voice recognition will choose between the mobile device voice recognition database 316 or the head unit voice recognition database 318. To determine which database to use, the voice recognition module 310 will determine whether the user interface module 302 is displaying the current user interface of the mobile device 120, as shown at step 612. If the user interface module 302 is displaying the current user interface of the mobile device 120, the voice recognition module 310 will use the mobile device voice recognition database 316 to perform voice recognition, as shown at step 614. If the user interface module 302 is not displaying the current user interface of the mobile device 120, the voice recognition module 310 will use the head unit voice recognition database 318 to perform voice recognition, as shown at step 620. Similarly, if the mobile device voice recognition database 316 is selected but the uttered command is not found in the mobile device voice recognition database 316, then the voice recognition module 310 will use the head unit voice recognition database

318, as shown at step 620. When the mobile device voice recognition database 316 is selected and the uttered command is found in the mobile device voice recognition database 316 at step 616, the voice recognition module 310 will communicate the input mechanism that was selected by the user, as shown at step 618.

When the head unit voice recognition database 318 is used, the voice recognition module 310 will check the head unit voice recognition database 318 for the uttered voice command. If the command is found in the head unit voice recognition database 318, then the command will be executed, as shown at step 624. If the command is not found in the head unit voice recognition database 318, then the command is deemed not found, and the user may be notified that an invalid command was uttered.

Figure 7:
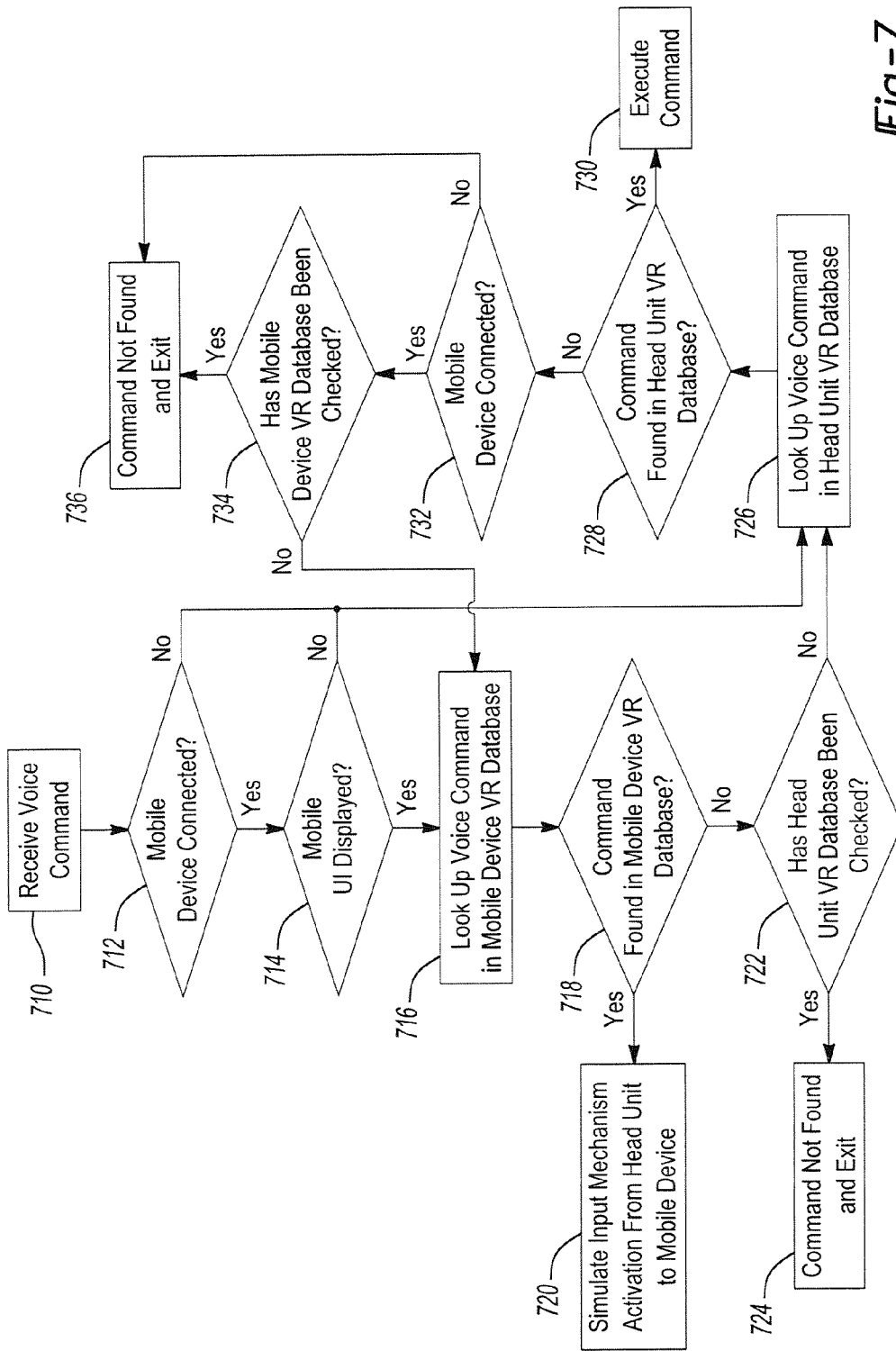
FIG. 7 is a flow chart illustrating an alternate method for performing voice recognition.

Referring now to FIG. 7, an alternative method for performing voice recognition is illustrated. Initially, the user will initiate the voice recognition functionality by performing an affirmative action such as pressing a button for voice recognition. The user will then utter a voice command. The voice recognition module 310 receives the voice command of the user, as shown at step 710. As discussed above, the voice recognition module 310 may use techniques such as Hidden Markov Models to determine the word or phrase that was uttered by the user. Upon receiving a voice command, the voice recognition module 310 will determine which voice recognition database to search first. If the mobile device 120 is connected to or in communication with the head unit 100 (step 712) and the head unit 100 is displaying the current user interface screen of the mobile device 120 (step 714), then the voice recognition module 310 will use the mobile device voice recognition database 316, as shown at step 716. If, however, the mobile device 120 is not connected to or in communication with the head unit 100, or if the head unit 100 is not displaying the current user interface of the mobile device 120, then the voice recognition module 310 will use the head unit voice recognition database 318 to initially perform voice recognition, as shown at step 726.

In the instance that the voice recognition module 310 utilizes the mobile device voice recognition database 316, the voice recognition module 310 will query the mobile device voice recognition database 316 with the word or phrase determined at step 710. If the voice recognition module 310 finds a command in the mobile device voice recognition database 316 that matches the uttered command, then the voice recognition module 310 can communicate to the mobile device 120 that the user has selected a user input mechanism at a particular location of the current user interface screen, as shown at step 720. As described earlier, entries in the mobile device voice recognition database 316 include the voice command and the location of the input mechanism on the user interface screen. It is appreciated that in some embodiments, the voice recognition module 310 will communicate to the user interface module 302 that the user has selected a particular input mechanism, and the user interface module 302 communicates the location of the selected input mechanism to the mobile device 120.

If the voice command is not found in the mobile device voice recognition database 316, then the voice recognition module 310 will determine whether the voice command was searched for in the head unit voice recognition database 318, as shown at step 722. If the head unit voice recognition database 318 has been searched, then the voice recognition module 310 will determine that the uttered voice command is not found, as shown at step 724. In this scenario, the head unit 100 may provide the user with some feedback, such as an audible message indicating that the command was not found.

When the voice recognition module 310 determines that the head unit voice recognition database 318 has not been searched, then the voice recognition module 310 will search the head unit voice recognition database 318 for the uttered voice command. The voice recognition module 310 will query the head unit voice recognition database 318 with the uttered voice command determined at step 710. If a match is found in the head unit voice recognition database 318, the voice recognition module 310 will receive a command or action corresponding to the uttered voice command from the head unit voice recognition database 318. The voice recognition module 310 will communicate the command to the head unit control module 308, which will execute the command, as shown at step 730.

If the uttered voice command is not found in the head unit voice recognition database 318, the voice recognition module 310 will determine if the mobile device 120 is connected to or in communication with the head unit 100. If the mobile device 120 is not connected to or in communication with the head unit 100, then the voice recognition module 310 determines that the uttered voice command is not found, as shown at step 736. If, however, the mobile device 120 is connected to or in communication with the head unit 100, then the voice recognition module 310 will determine whether the mobile device voice recognition database 316 has already been searched for the voice command, as shown at step 734. If the mobile device voice recognition database 316 has already been searched, then the voice recognition module 310 determines that the uttered voice command is not found, as shown at step 736. As mentioned above, when the voice recognition module 310 determines that an uttered voice command cannot be found, an audible message may be played to the user indicating that the command is not found. If the mobile device voice recognition database 316 has not been searched, then the voice recognition module 310 searches the mobile device voice recognition database 316 for the uttered voice command, as shown at step 716.

The foregoing description is merely illustrative in nature and is in no way intended to limit the disclosure, its application, or uses. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method for remotely operating a mobile device from a vehicle head-unit using voice recognition, the method comprising:
   receiving a representation of a user interface screen of the mobile device from the mobile device, the user interface screen including an input button which provides a command to the mobile device when the input button is directly engaged by a user;
   scanning the representation of the user interface screen to find a representation of the input button;
   scanning the representation of the input button;
   determining if the input button is associated with a current voice recognition command;
   creating an assigned voice recognition command based upon the scanning of the representation of the input button only when the input button is not associated with the current voice recognition command; and
   associating the assigned voice recognition command with the input button in a voice recognition database, wherein when a user utters the assigned voice recognition command the head unit transmits a signal corresponding to the input button to the mobile device.

2. The method of claim 1 further comprising displaying the representation of the user interface screen on a display of the head-unit.

3. The method of claim 1 wherein the scanning of the representation of the user interface screen comprises performing image processing on the representation of the user interface screen to determine a location of the input button on the representation of the user interface screen.

4. The method of claim 1 wherein scanning the representation of the input button comprises performing optical character recognition on the representation of the input button.

5. The method of claim 4 wherein the creation of the voice recognition command is based on a result of the optical character recognition performed on the representation of the input button.

6. The method of claim 4 wherein an optical character recognition application is configured to recognize characters and predetermined symbols and creating the assigned voice recognition associates a word or phrase with the scanned input button based on the recognized characters or predetermined symbols.

7. The method of claim 6 wherein the predetermined symbols are associated with predetermined words or phrases.

8. The method of claim 1 further comprising receiving a set of predetermined voice recognition commands from the mobile device and storing the set of predetermined voice recognition commands in the voice recognition database.

9. A head unit of a vehicle configured to remotely operate a mobile device using voice recognition, the head-unit comprising:
   a head unit voice recognition database that stores a head-unit voice recognition command corresponding to an input mechanism found only in the head unit, wherein when a user utters the head-unit voice recognition command, the head unit transmits a signal corresponding to the input button found only in the head unit;
   a communication module that receives a representation of a user interface screen of the mobile device from the mobile device, the user interface screen including an input button which provides a command to the mobile device when the input button is directly engaged by the user;
   an image scanning module that scans the representation of the user interface screen to find a representation of the input mechanism found only on the representation of the user interface screen, wherein the input button;
   a character recognition module that scans the representation of the input button found by the image scanning module to determine a mobile device voice recognition command, wherein the mobile device voice recognition command is determined based on at least one character or symbol identified by the character recognition module; and
   a mobile device voice recognition database that stores the mobile device voice recognition command corresponding to the input button found only in the user interface screen, wherein when the user utters the mobile device voice recognition command the head unit transmits a signal corresponding to the input button to the mobile device.

10. The head unit of claim 9 further comprising a display that displays the representation of the user interface screen of the mobile device.

11. The head unit of claim 9 wherein the image scanning module performs image recognition to determine a location of the input button on the user interface screen.

12. The head unit of claim 9 wherein the character recognition modules performs optical character recognition on the representation of the input button.

13. The head unit of claim 12 wherein the mobile device voice recognition command determined by the character recognition module is based on a result of the optical character recognition preformed on the representation of the input button.

14. The head unit of claim 12 wherein the character recognition module is configured to recognize characters and predetermined symbols and to associate a word or phrase with the scanned input button based on the recognized characters or predetermined symbols.

15. The head unit of claim 14 wherein the predetermined symbols are associated with predetermined words or phrases.

16. The head unit of claim 9 wherein the communication receives a set of predetermined mobile device voice recognition commands from the mobile device, wherein the predetermined mobile device voice recognition commands are stored in the mobile device voice recognition database of the head unit.

* * * * *